(12) United States Patent
Schnug et al.

(10) Patent No.: US 9,616,935 B2
(45) Date of Patent: Apr. 11, 2017

(54) VEHICLE STRUCTURES AND METHODS OF ASSEMBLING THE SAME

(71) Applicant: Toyota Motor Engineering & Manufacturing North America, Inc., Erlanger, KY (US)

(72) Inventors: Tyler E. Schnug, Northville, MI (US); Kuo Sun, Ann Arbor, MI (US); Mark D. Clauser, Saline, MI (US); Yizhou Fan, Ann Arbor, MI (US); Donald E. Maynard, Ypsilanti, MI (US); Kevin J. O'Beirne, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/682,789

(22) Filed: Apr. 9, 2015

(65) Prior Publication Data

US 2016/0101815 A1   Apr. 14, 2016

Related U.S. Application Data

(60) Provisional application No. 62/062,540, filed on Oct. 10, 2014.

(51) Int. Cl.
*B62D 21/15* (2006.01)
*B62D 25/04* (2006.01)
*B23K 31/02* (2006.01)
*B62D 25/06* (2006.01)
*B62D 25/02* (2006.01)

(52) U.S. Cl.
CPC .............. *B62D 25/04* (2013.01); *B23K 31/02* (2013.01); *B62D 21/157* (2013.01); *B62D 25/02* (2013.01); *B62D 25/025* (2013.01); *B62D 25/06* (2013.01)

(58) Field of Classification Search
CPC ...... B62D 21/157; B62D 25/04; B62D 25/06; B23K 31/02; E05D 3/18; A61G 3/061; A61G 3/062
USPC ........................ 296/187.12; 228/182; 29/428
See application file for complete search history.

(56) References Cited

U.S. PATENT DOCUMENTS

| | | | |
|---|---|---|---|
| 5,011,201 A | 4/1991 | Takahashi et al. | |
| 6,189,953 B1 | 2/2001 | Wycech | |
| 6,293,617 B1 | 9/2001 | Sukegawa | |

(Continued)

OTHER PUBLICATIONS http://automotive.arcelormittal.com/tailoredblanks/TB_products/1230.
"Fundamentals of Automobile Body Structure Design" by Donald E. Malen. Copyright 2011 SAE International.

*Primary Examiner* — Pinel Romain
(74) *Attorney, Agent, or Firm* — Dinsmore & Shohl LLP (57) ABSTRACT

Vehicle structures and methods of assembling the same are disclosed herein. In one embodiment, a method of assembling a unibody structure of a vehicle includes assembling a door surround ring comprising a forward pillar portion, a roof rail portion, a rearward pillar portion, and a rocker portion. The method also includes, subsequent to assembling the door surround ring, installing the door surround ring into a vehicle side outer panel, coupling the door surround ring to the vehicle side outer panel. The method further includes, subsequent to installing the door surround ring into the vehicle side outer panel, coupling the door surround ring and the vehicle side outer panel to a vehicle interior structural member.

20 Claims, 8 Drawing Sheets

(56) References Cited

U.S. PATENT DOCUMENTS

| | | |
|---|---|---|
| 6,364,358 B1 | 4/2002 | Miller |
| 6,648,404 B2 | 11/2003 | Yakata et al. |
| 6,910,732 B2 * | 6/2005 | Miyoshi ............ B62D 25/2036 296/187.12 |
| 7,357,448 B2 * | 4/2008 | Chen .................... B62D 25/04 296/187.12 |
| 7,862,108 B2 | 1/2011 | Tamakoshi |
| 8,152,223 B2 * | 4/2012 | Beck ..................... B62D 25/02 296/181.1 |
| 8,177,292 B1 | 5/2012 | Baccouche et al. |
| 8,371,643 B2 | 2/2013 | Itakura |
| 8,585,134 B2 | 11/2013 | Yasui et al. |
| 8,657,368 B2 | 2/2014 | Freeman et al. |
| 8,662,575 B2 | 3/2014 | Tamura |
| 8,690,227 B2 | 4/2014 | Matsuoka et al. |
| 8,702,160 B2 | 4/2014 | Kurogi et al. |
| 8,720,984 B2 | 5/2014 | Kurogi et al. |
| 8,720,985 B2 | 5/2014 | Izumi et al. |
| 8,740,290 B2 | 6/2014 | Takayama et al. |
| 8,757,709 B2 | 6/2014 | Rawlinson et al. |
| 8,833,839 B2 | 9/2014 | Young et al. |
| 8,998,558 B2 * | 4/2015 | Kitchin ................... A61G 3/06 280/6.152 |
| 2005/0046238 A1 * | 3/2005 | Miyoshi ............ B62D 25/2036 296/203.03 |
| 2012/0319432 A1 * | 12/2012 | Bodin .................... B62D 25/02 296/203.03 |
| 2013/0313859 A1 * | 11/2013 | Barz ..................... B62D 25/04 296/193.06 |
| 2014/0159427 A1 * | 6/2014 | Kim ..................... B62D 25/04 296/193.06 |
| 2014/0232138 A1 * | 8/2014 | Kanaguichi ........... B62D 25/04 296/187.12 |
| 2014/0354009 A1 * | 12/2014 | Honda .................. B62D 25/00 296/187.12 |
| 2015/0130224 A1 * | 5/2015 | Donabedian ........... B62D 25/16 296/198 |
| 2015/0166110 A1 * | 6/2015 | Torii ..................... B62D 25/02 296/187.12 |
| 2015/0284028 A1 * | 10/2015 | Yamada ............... B62D 25/025 403/272 |

* cited by examiner

FIG. 8 ns and Methods of

VEHICLE STRUCTURES AND METHODS OF ASSEMBLING THE SAME

CROSS-REFERENCE TO RELATED APPLICATIONS

The present application claims the benefit of priority of U.S. Provisional Patent Application No. 62/062,540, filed on Oct. 10, 2014 and title "Vehicle Structures and Methods of Assembling the Same," the entire disclosure of which is hereby incorporated by reference.

TECHNICAL FIELD

The present specification generally relates to vehicle structures that include door surround rings and, in particular, vehicle structures having door surround rings that are assembled prior to installation into a vehicle side outer panel.

BACKGROUND

Unibody vehicle structures support a vehicle's drivetrain and suspension, and support body panels of the vehicle, which define the overall shape and appearance of the exterior of the vehicle. Together with the vehicle body panels, the unibody vehicle structures also provide strength and stiffness at various positions around the vehicle to absorb and transfer energy in the event of contact with a barrier.

In some configurations, energy may be introduced to the vehicle support structures through a small overlap impact in which a barrier contacts only a portion of the vehicle across the width of the vehicle. In such configurations, energy may be directed rearward toward the vehicle cabin by a wheel that transfers energy to the A-pillar portion of the unibody vehicle structure. In some impact configurations, a barrier may also or may alternatively directly impact the A-pillar portion, thereby directing energy into the vehicle cabin.

Accordingly, vehicle structures for managing the direction and dissipation of energy introduced to the A-pillar may be desired.

SUMMARY

In one embodiment, a door surround sub-assembly includes a door surround ring including a forward pillar portion, a rocker portion welded to the forward pillar portion, a rearward pillar portion welded to the rocker portion, and a roof rail portion welded to the rearward pillar portion, a vehicle side outer panel welded to the door surround ring, and a vehicle side inner panel coupled to the door surround ring, where the forward pillar portion, the rocker portion, the rearward pillar portion, and the roof rail portion are welded to one another before the door surround ring is welded to the vehicle side outer panel and the vehicle side inner panel.

In another embodiment, a method of assembling a unibody for a vehicle includes assembling a door surround ring including a forward pillar portion, a roof rail portion, a rearward pillar portion, and a rocker portion, subsequent to assembling the door surround ring, installing the door surround ring into a vehicle side outer panel, coupling the door surround ring to the vehicle side outer panel, and subsequent to installing the door surround ring into the vehicle side outer panel, coupling the door surround ring and the vehicle side outer panel to a vehicle interior structural member.

In yet another embodiment, a unibody for a vehicle including a vehicle interior structural member, a vehicle side outer panel coupled to the vehicle interior structural member, and a door surround ring coupled to the vehicle side outer panel, the door surround ring including a forward pillar portion, a rocker portion welded to the forward pillar portion, a rearward pillar portion welded to the rocker portion, and a roof rail portion welded to the forward pillar portion and the rearward pillar portion, where components of the door surround ring are welded to one another by welds that are applied in an inboard direction and an outboard direction relative to a vehicle lateral direction, and a roof patch that is welded to the forward pillar portion and the roof rail portion along a patch weld interface that is offset from a clamshell weld interface of the forward pillar portion or the roof rail portion evaluated in the vehicle lateral direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles having door surround rings are described herein. Such vehicles may include a vehicle interior structural member, a vehicle side outer panel coupled to the vehicle interior structural member, and a door surround ring coupled to the vehicle side outer panel. The door surround ring includes a forward pillar portion, a rocker portion welded to the forward pillar portion, a rearward pillar portion welded to the rocker portion, and a roof rail portion welded to the forward pillar portion and the rearward pillar portion. During assembly, the door surround ring may be assembled and welded together prior to installation into the vehicle side outer panel. Components of the door surround ring are welded to one another by welds that are applied in an inboard direction and an outboard direction relative to a vehicle lateral direction. Various embodiments of vehicles including door surround rings are described in detail below.

As used herein, the term "vehicle longitudinal direction" refers to the forward-rearward direction of the vehicle (i.e., in the +/− vehicle X-direction depicted in FIGS. 1-6). The term "vehicle lateral direction" refers to the cross-vehicle direction (i.e., in the +/− vehicle Y-direction depicted in FIGS. 1-6), and is transverse to the vehicle longitudinal direction. The term "vehicle vertical direction" refers to the upward-downward direction of the vehicle (i.e., in the +/− vehicle Z-direction depicted in FIGS. 1-6). Further, the terms "inboard" and "outboard" are used to describe the relative positioning of various components of the vehicle. Referring to FIGS. 1-6, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 90.

Figure 1:
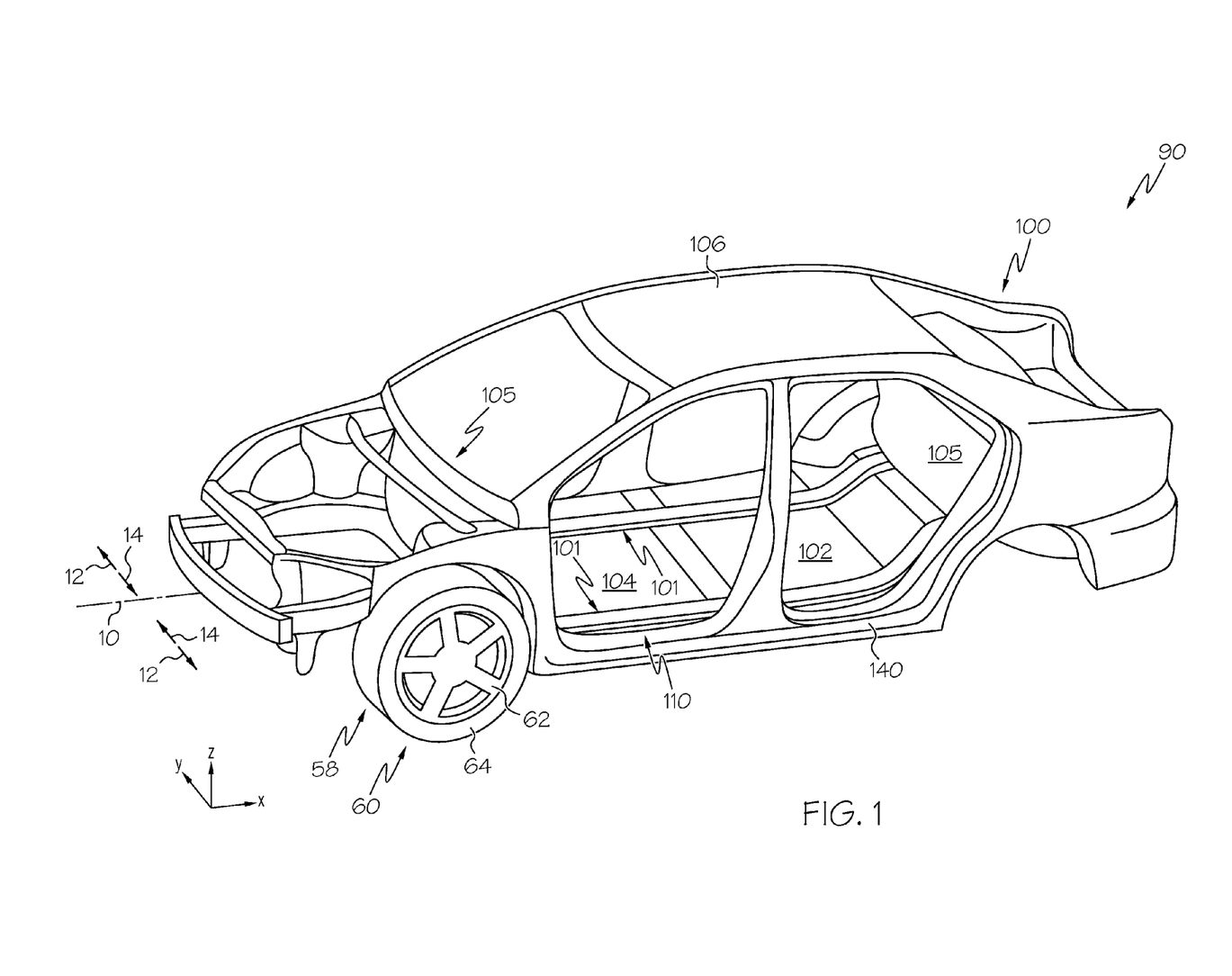
FIG. 1 schematically depicts a perspective view of a portion of a vehicle according to one or more embodiments shown or described herein.

Referring now to FIG. 1, a unibody 100 for a vehicle 90 is generally depicted. The unibody 100 includes a plurality of vehicle interior structural members 102, including side supports 101 that generally extend in a vehicle longitudinal direction, a floor board 104 that is positioned proximate to the lower side of the vehicle 90 and may define the passenger cabin 110 of the vehicle 90. The vehicle interior structural members 102 further include a roof 106 that is positioned proximate to the upper side of the vehicle 90 and may also define the passenger cabin 110 of the vehicle. The vehicle interior structural members 102 may also include a dash panel 105 that extends in the vehicle lateral direction between opposing sides of the unibody 100.

The vehicle 90 may include a pair of front suspension units 58 that are coupled to the unibody 100 of the vehicle 90. The front suspension units 58 may generally include vehicle components that connect the unibody 100 to a wheel assembly 60. These components may include control arms, steering links, and a front chassis member including a spring and a strut. The spring and the strut may be coupled to a knuckle assembly including a hub. The wheel assembly 60 may be coupled to the hub. The wheel assembly 60 includes a tire 64 that is mounted to a rim 62.

Figure 2:
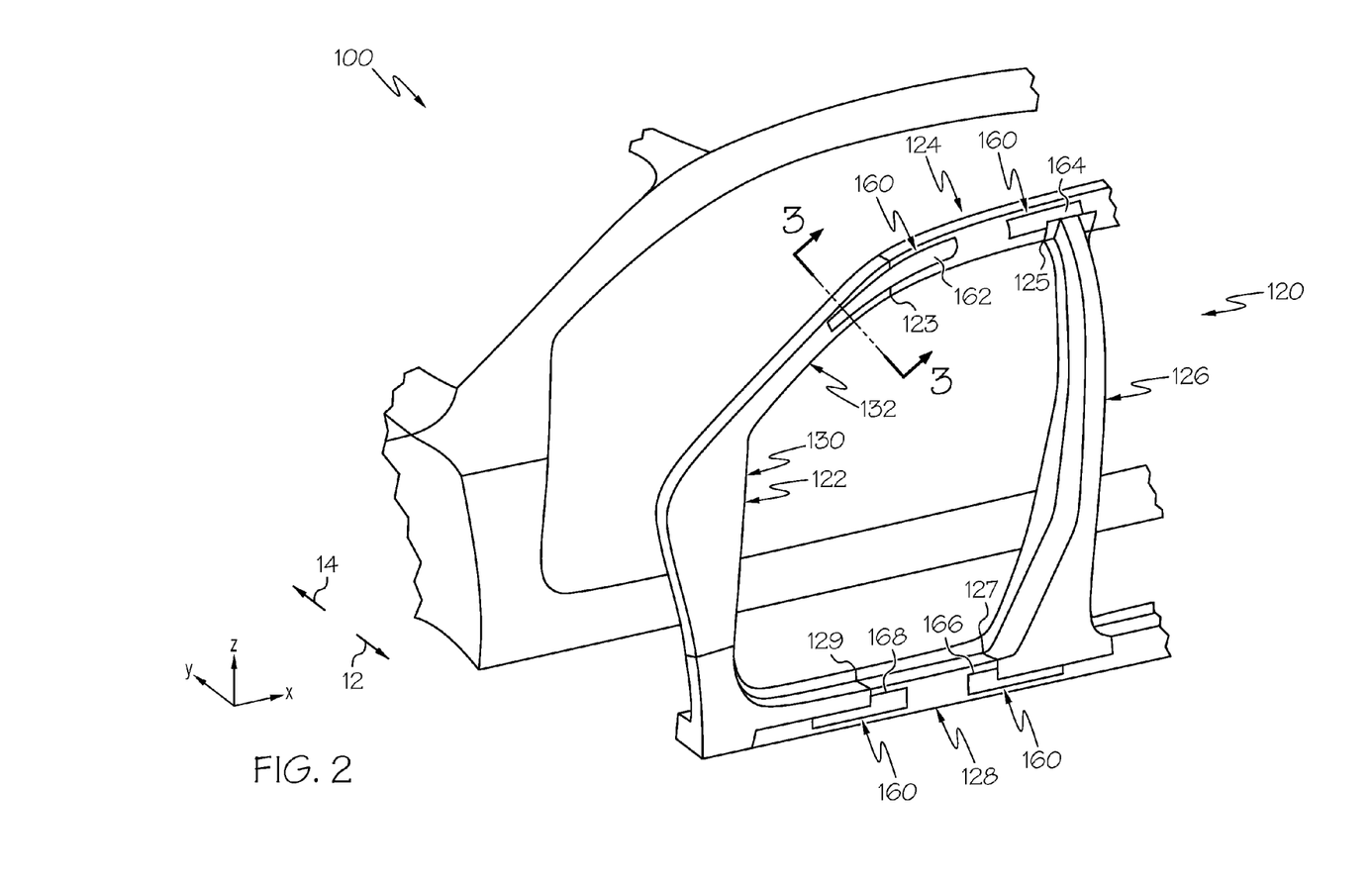
FIG. 2 schematically depicts an exploded perspective view of a portion of a vehicle according to one or more embodiments shown or described herein.

Referring to FIG. 2, additional vehicle structural components may be coupled to to the vehicle interior structural members 102, for example, a door surround ring 120 that includes an A-pillar portion 122, a roof rail portion 124, a B-pillar portion 126, and a rocker portion 128. The A-pillar portion 122 may include a hinge pillar region 130 that extends upward from the rocker portion 128 in the vehicle vertical direction. A hinge and a door (not depicted) may be coupled to the hinge pillar region 130. The A-pillar portion 122 may further include a side region 132 that extends upward from the hinge pillar region 130 in the vehicle vertical direction and extends rearward from the hinge pillar region 130 in the vehicle longitudinal direction. The side region 132 extends rearward to the roof rail portion 124. The components of the door surround ring 120 may be overlayed with a vehicle side outer panel 140 (as depicted in FIG. 1) that may abut the door surround ring 120. Vehicle doors may be fitted into the opening provided by the door surround ring 120 and the vehicle side outer panel 140.

The unibody 100 may include a plurality of components that are coupled to one another to provide the desired strength and/or stiffness of vehicle. As depicted in FIG. 2, elements of the unibody 100 such as the A-pillar portion 122, the roof rail portion 124, the B-pillar portion 126, and the rocker portion 128 may be formed from sheet metal. The sheet metal used to form the unibody 100 may include various thicknesses and tensile strengths such that, when assembled into the unibody 100, the unibody 100 satisfies design requirements of strength, stiffness, weight, and cost.

The unibody 100 includes the door surround ring 120 in which the hinge pillar region 130 of the A-pillar portion 122 is welded to the rocker portion 128 and the side region 132 of the A-pillar portion 122 is welded to the roof rail portion 124. The B-pillar portion 126 is welded to the rocker portion 128 and the roof rail portion 124. The A-pillar portion 122, the roof rail portion 124, the B-pillar portion 126, and the rocker portion 128 may be selectively positioned relative to one another such that the overlapping portions of the A-pillar portion 122, the roof rail portion 124, the B-pillar portion 126, and the rocker portion 128 may be positioned relative to one another to form strong attachments between the adjacent components. In some embodiments, the overlapping portions of the A-pillar portion 122, the roof rail portion 124, the B-pillar portion 126, and the rocker portion 128 may be interleaved with one another such that the joints between adjacent components overlap one another in the vehicle lateral direction, thereby further increasing the stability of the joints between the adjacent components.

The door surround ring 120 may also include at least one joint reinforcement member 160 that is coupled to adjacent components of the door surround ring 120. The joint reinforcement member 160 may include a roof patch 162 that is coupled to the A-pillar portion 122 and the roof rail portion 124. The roof patch 162 may extend along the side region 132 of the A-pillar portion 122 and the roof rail portion 124 and across the joint location 123 between the A-pillar portion 122 and the roof rail portion 124. The joint reinforcement member 160 may also include a header patch 164 that is coupled to the roof rail portion 124 and the B-pillar portion 126. The header patch 164 may extend along the roof rail portion 124 and the B-pillar portion 126 and across or otherwise along the joint location 125 between the roof rail portion 124 and the B-pillar portion 126. The joint reinforcement member 160 may also include a rocker patch 166 that is coupled to the B-pillar portion 126 and the rocker portion 128. The rocker patch 166 may extend along the B-pillar portion 126 and the rocker portion 128 and across the joint location 127 between the B-pillar portion 126 and the rocker portion 128. The joint reinforcement member 160 may also include a footwell patch 168 that is coupled to the A-pillar portion 122 and the rocker portion 128. The footwell patch 168 may extend along the A-pillar portion 122 and the rocker portion 128 and across the joint location 129 between the A-pillar portion 122 and the rocker portion 128. The joint reinforcement member 160 may be selected with appropriate thickness and/or strength to supplement the strength of the door surround ring 120 at positions proximate to the respective joint location of the door surround ring 120. In one embodiment, the composite strength of the joint reinforcement member 160 and the underlying door surround ring 120 may be at least 30% greater than the tensile strength of the underlying material of the door surround ring 120 alone.

The joint reinforcement members 160 may provide additional stability to the joint locations between adjacent components of the door surround ring 120. The joint reinforcement members 160 may extend across the joint locations of adjacent components of the door surround ring 120, thereby increasing the section modulus of the door surround ring 120 at locations proximate to the joint locations. The joint reinforcement members 160 may increase the stiffness of the door surround ring 120. The joint reinforcement members 160 may also increase the capacity of the door surround ring 120 to transfer energy across the joint locations between adjacent components of the door surround ring 120.

Figure 3:
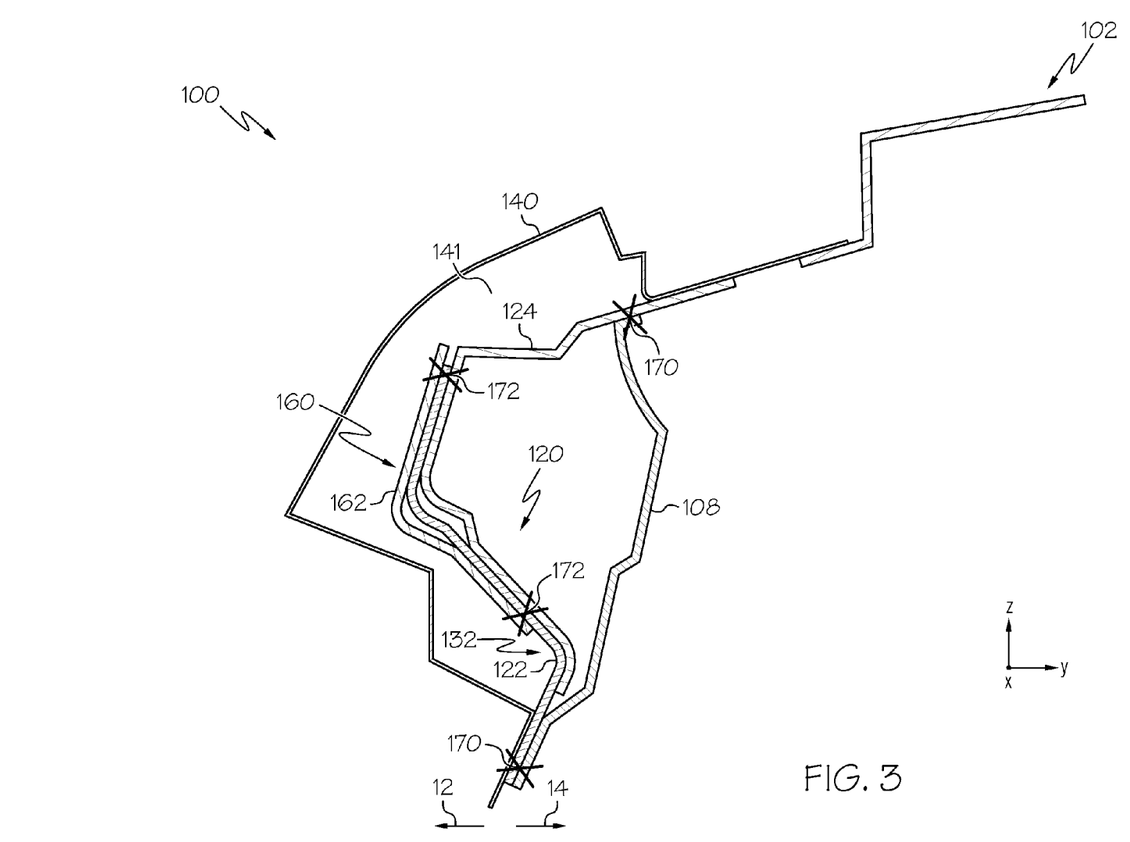
FIG. 3 schematically depicts a sectional view of a roof rail portion of a vehicle along line 3-3 of FIG. 2.

Referring now to FIG. 3, a sectional view of the unibody 100 is depicted at a location proximate to the roof patch 162 depicted in FIG. 2. In embodiments, the components of the door surround ring 120, for example, the A-pillar portion 122, the roof rail portion 124, the B-pillar portion 126 (FIG. 2), and the rocker portion 128 (FIG. 2) may be coupled to one another along a clamshell weld interface 170. In some embodiments, the door surround ring 120 may be coupled to the vehicle interior structural members 102 at the clamshell weld interface 170. The unibody 100 may also include the vehicle side outer panel 140 that is coupled to the door surround ring 120. The vehicle side outer panel 140 may generally be positioned outboard from the door surround ring 120 when evaluated in the vehicle lateral direction. The vehicle side outer panel 140 may provide the exterior aesthetic surface of the unibody 100 in positions proximate to the door surround ring 120, and into which the doors of the vehicle 90 are positioned.

As depicted in FIG. 3, the joint reinforcement members 160 may be coupled to adjacent components of the door surround ring 120 at positions that are spaced apart from the clamshell weld interface 170 in the vehicle lateral direction. In some embodiments, the adjacent components, such as the A-pillar portion 122 and the roof rail portion 124 shown in FIG. 3, may extend outboard in the vehicle lateral direction, forming a generally hat-shaped cross-section. As depicted in FIG. 3, the joint reinforcement member 160, here the roof patch 162, may be coupled to the side region 132 of the A-pillar portion 122 and the roof rail portion 124 at a patch weld interface 172. The patch weld interface 172 between the roof patch 162, the A-pillar portion 122, and the roof rail portion 124 may be located at a position that outboard of and spaced apart from the clamshell weld interface 170 in the vehicle lateral direction. This welding arrangement can facilitate a door surround ring 120 sub-assembly that is then attached to the vehicle interior structural members 102, as will be described in greater detail below. Both the clamshell weld interface 170 and the patch weld interface 172 of the door surround ring 120 may be encapsulated by the vehicle side outer panel 140. The patch weld interface 172 and the joint reinforcement member 160 may be spaced apart from the vehicle side outer panel 140 in an interior volume 141 formed between the roof rail portion 124 and the vehicle side outer panel 140. Because the patch weld interface 172 is encapsulated by the vehicle side outer panel 140, the patch weld interface 172 may be formed through welding of the joint reinforcement member 160 to the adjacent door surround ring 120 components prior to the door surround ring 120 being assembled into the vehicle side outer panel 140, as will be discussed in greater detail below.

By incorporating the joint reinforcement members 160 at locations that extend across joint locations at which adjacent components of the door surround ring 120 are coupled to one another, the overall strength and/or stiffness of the door surround ring 120 may be enhanced as compared to conventional designs. The increase in strength and/or stiffness of the door surround ring may be enhanced through an increase in quantity of welds between adjacent components of the door surround ring 120. The strength and/or stiffness of the door surround ring 120 may also be enhanced through spacing of the clamshell weld interface 170 and the patch weld interface 172. By spacing the clamshell weld interface 170 apart from the patch weld interface 172 in the vehicle lateral direction, the door surround ring 120 may incorporate two high rigidity portions that are maintained at a distance from one another, thereby forming a cross-section portion that is resistant to bending.

When a barrier impacts the vehicle, vehicle structures may elastically and plastically deform while the vehicle slows from its previous operating speed. The impact with the barrier may divert the energy associated with the moving vehicle into energy that deforms the vehicle structures. The vehicle structures may accommodate impact with the barrier such that the energy associated with the impact may be controllably dissipated through selective and preferential deformation of the vehicle structures.

A barrier may impact a front corner of the vehicle in what is referred to herein as a small front bumper overlap impact or a small offset barrier impact. When a vehicle is involved in a small front bumper overlap impact, only a portion of the front bumper impacts the barrier, for example about 25% of the front bumper evaluated in the vehicle longitudinal direction. During a small front bumper overlap impact some of the energy dissipation elements of the vehicle structure may not be initiated. Instead, in a small front bumper overlap impact, the energy that is introduced to the vehicle structures may be non-symmetrical across the vehicle width. Accordingly, the response of the vehicle structures to the energy introduced by the small front bumper overlap impacts may induce a non-symmetrical response to the vehicle structures. Referring to embodiments disclosed herein that are incorporated into vehicles that have a unibody 100, the various components of the unibody 100 may be non-symmetrically loaded when the vehicle 90 is involved in a small front bumper overlap impact. The non-symmetrical loading may concentrate the energy into the side of the vehicle 90 that is positioned proximate to the barrier that the vehicle impacts.

Figure 4:
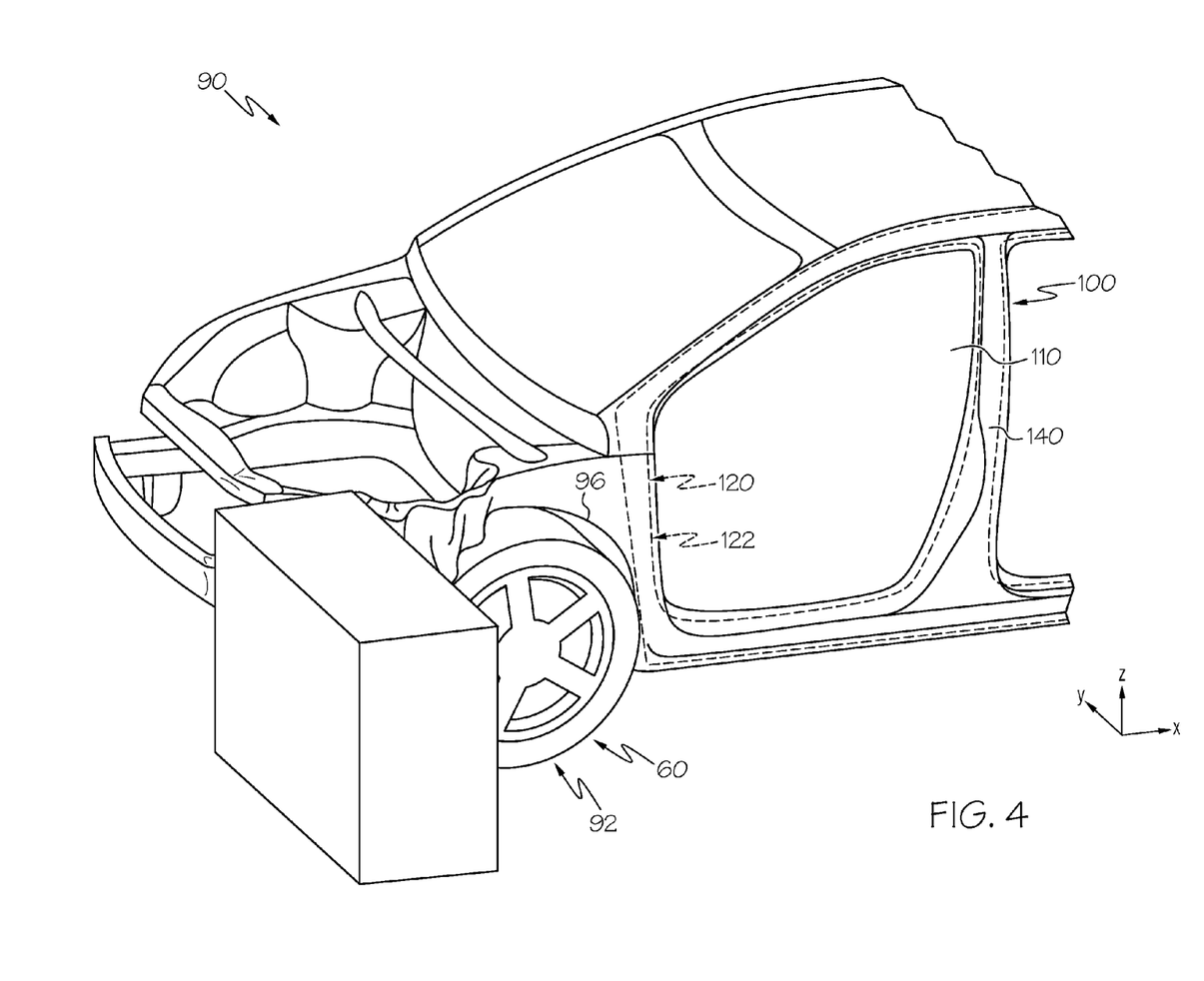
FIG. 4 schematically depicts a front perspective view of a portion of a vehicle impacting a barrier according to one or more embodiments shown or described herein.

Referring to FIG. 4, a barrier is depicted impacting a front corner of the vehicle 90. The various components of the vehicle 90 elastically and plastically deform to absorb the energy of the impact. In a small front bumper overlap impact, the vehicle 90 impacts the barrier at an outboard side of the vehicle 90.

Because only a portion of the front bumper contacts the barrier during a small front bumper overlap impact, conventional energy absorbing structures associated with the front bumper may have a reduced effect on the dissipation of energy of the contact with the barrier. Instead, the energy from the impact may be directed into the front suspension units 58 of the vehicle.

As noted hereinabove, when a vehicle undergoes a small front bumper overlap impact, some of the conventional energy absorbing structures associated with the front bumper of the vehicle may not be activated or may be partially activated, such that a portion of the energy absorbing structure of the vehicle may not dissipate energy associated with the small front bumper overlap barrier impact. Instead, the energy of the impact may be directed into the front suspension unit 92 that is positioned proximate to barrier that impacts the vehicle and/or the A-pillar portion 122 that is positioned proximate to the barrier that impacts the vehicle. Referring to FIG. 4, the energy of the impact is directed into the front suspension unit 92, for example, the wheel assembly 60. This energy that is directed into the wheel assembly 60 may further be directed in a generally rearward direction in the vehicle longitudinal direction. The wheel assembly 60 may continue to be directed rearward until the wheel assembly 60 contacts the wheel arch 96 that is positioned proximate to the wheel assembly 60 and incorporated into the unibody 100 of the vehicle 90. The wheel assembly 60 may impact the wheel arch 96 and transfer at least some of the energy associated with the small front bumper overlap impact into the unibody 100 of the vehicle 90, for example, the A-pillar portion 122 of the door surround ring 120. This transferred energy from the wheel assembly 60 to the A-pillar portion 122 may cause the A-pillar portion 122 to deform. The A-pillar portion 122 may be deformed in a generally rearward direction in the vehicle longitudinal direction. The A-pillar portion 122 may deform according to the location and orientation of force that is introduced to the A-pillar portion 122 by the wheel assembly 60. The energy associated with the impact may also be directed along the unibody 100 and vehicle 90 structures in a generally rearward direction in the vehicle longitudinal direction. The unibody 100 may direct the energy away from the passenger cabin 110 of the vehicle 90

Because the door surround ring 120 exhibits greater strength and/or stiffness as compared to conventional designs, the door surround ring 120 may resist deformation of the unibody 100 in a small front bumper overlap barrier impact. Reducing deformation of the unibody 100 may reduce the introduction of energy into the passenger cabin of the vehicle 90. Further, reducing deformation of the unibody structures may reduce intrusion of vehicle structures into the passenger cabin.

While specific reference has been made herein to unibody structures that form the A-pillar portion or the B-pillar portion, it should be understood that the structures described herein may be incorporated into any of the plurality of locations within the unibody structure. Accordingly, while specific reference has been made herein to A-pillar portions, B-pillar portions, it should be understood that these terms may be used interchangeably with "a forward pillar portion" or "a rearward pillar portion," where appropriate based on the position of the various A-pillars, B-pillars, C-pillars, and D-pillars within the vehicle 90.

Referring again to FIGS. 2 and 3, the unibody 100 of the vehicle may be assembled to provide access to complete attachment procedures in which the elements of the various sub-assemblies can be secured as its own sub-assembly prior to connection to the surrounding unibody structures. Referring to FIG. 2, the door surround ring 120 may first be assembled separately from the surrounding unibody structures. The door surround ring 120 may be assembled by positioning and coupling the A-pillar portion 122, the roof rail portion 124, the B-pillar portion 126, and the rocker portion 128 to one another. In some embodiments, the A-pillar portion 122, the roof rail portion 124, the B-pillar portion 126, and the rocker portion 128 may be coupled to one another through a welding operation. For example and referring to FIG. 3, the side region 132 is welded to the roof rail portion 124 at the patch weld interface 172. In embodiments, the various components of the door surround ring 120 may similarly be coupled to one another at the patch weld interface 172 and other interfaces in a similar fashion.

As the various components of the door surround ring 120 are coupled to one another, the joint reinforcement members 160 may simultaneously or subsequently be assembled and coupled to the various underlying components of the door surround ring 120 at the patch weld interface 172. In the embodiment shown in FIG. 3, the roof patch 162 is coupled to the roof rail portion 124 and the side region 132 at the patch weld interface 172. The header patch 164, the rocker patch 166, and/or the footwell patch 168 may be coupled to the door surround ring 120 in a similar fashion. As the door surround ring 120 is assembled separately from the surrounding unibody structures, access is provided from the inboard direction and the outboard direction to the door surround ring 120 as evaluated in the vehicle lateral direction. Therefore, for embodiments of the door surround ring 120 that are welded, welding operations can be completed along both the inboard-facing side and the outboard-facing side of the door surround ring 120. Additionally, as the door surround ring 120 is assembled separately from the surrounding unibody structures of the vehicle, the quantity and location of welds between components of the door surround ring 120 may be increased as compared to conventional assembly methods, such that the strength and/or stiffness of the door surround ring 120 may be increased.

Subsequent to assembling and coupling the components of the door surround ring 120 to one another and/or the joint reinforcement member 160 to the door surround ring 120, the door surround ring 120 may be assembled into the vehicle side outer panel 140 and a vehicle side inner panel 108. The door surround ring 120 may be temporarily clamped to the vehicle side outer panel 140 and/or the vehicle side inner panel 108 to retain the position of the door surround ring 120 with respect to the vehicle side outer panel 140 and/or the vehicle side inner panel 108. In some embodiments, at least some portions of the door surround ring 120 may be welded to the vehicle side outer panel 140 and the vehicle side inner panel 108 at the clamshell weld interface 170 to retain the position of the door surround ring 120 with respect to the vehicle side outer panel 140.

Subsequent to assembling the door surround ring 120 into the vehicle side outer panel 140 and/or the vehicle side inner panel 108, the door surround ring 120 including the vehicle side outer panel 140 and the vehicle side inner panel 108 may be coupled to the vehicle interior structural members 102. For example, portions of the door surround ring 120, the vehicle side panel outer 140, and the vehicle side inner panel 108 may be coupled to the roof 106 (FIG. 1) or the dash panel 105 (FIG. 1), Once assembled onto the vehicle interior structural members 102, the door surround ring 120 may be encapsulated by the vehicle side outer panel 140. Once assembled, the patch weld interface 172 between the joint reinforcement member 160 and the adjacent components of the door surround ring 120 may be positioned between the door surround ring 120 and the vehicle side outer panel 140 when evaluated in the vehicle lateral direction.

Figure 5:
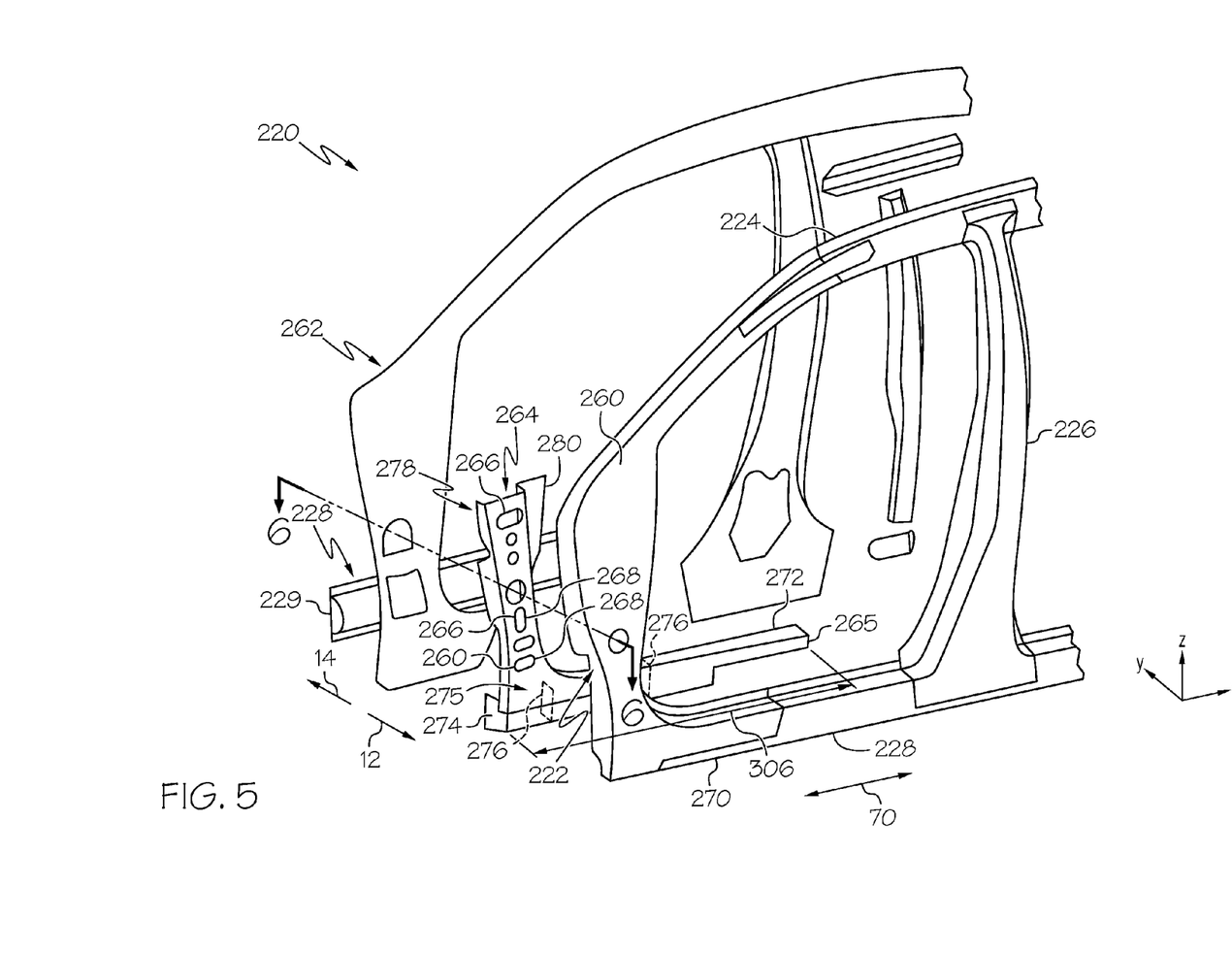
FIG. 5 schematically depicts an exploded perspective view of a portion of a vehicle according to one or more embodiments shown or described herein.

Referring now to FIG. 5, another embodiment of a door surround ring 220 for a unibody structure of a vehicle is depicted in an exploded state. In this embodiment, the door surround ring 220 includes an A-pillar portion 222, a roof rail portion 224, a B-pillar portion 226, and a rocker portion 228. The components of the door surround ring 220 may be overlayed with a vehicle side outer panel that may abut the door surround ring 220, as described hereinabove. Vehicle doors may be fitted into the opening provided by the door surround ring 220 and the vehicle side outer panel.

The door surround ring 220 includes the A-pillar portion 222. The A-pillar portion 222 generally extends in a vehicle vertical direction from the rocker portion 228. The A-pillar portion 222 includes a plurality of structural components that are coupled to one another to form the A-pillar portion 222. The A-pillar portion 222 may generally be coupled a dash panel that generally extends in a vehicle lateral direction between opposing A-pillar portions 222 of the unibody structures of the vehicle (similar to the dash panel 105 shown in FIG. 1).

The A-pillar portion 222 includes an inboard A-pillar member 262 and an outboard A-pillar member 260 that is positioned outboard of the inboard A-pillar member 262 in the vehicle lateral direction and is coupled to the inboard A-pillar member 262. The A-pillar portion 222 further includes a reinforcement member 264 that is positioned between the inboard A-pillar member 262 and the outboard A-pillar member 260. The reinforcement member 264 is coupled to the outboard A-pillar member 260. Alternatively or additionally, the reinforcement member 264 may be coupled to the inboard A-pillar member 262. The reinforcement member 264 has a plurality of reduced thickness regions 266 that are positioned in the vehicle vertical direction along the reinforcement member 264. In the embodiment depicted in FIG. 5, the plurality of reduced thickness regions 266 include through-holes 268 that pass through the reinforcement member 264. The plurality of reduced thickness regions 266 may reduce the strength and/or stiffness of the reinforcement member 264 at locations proximate to the reduced thickness regions 266, including reducing the strength and/or stiffness of the reinforcement member 264 in the vehicle longitudinal direction.

Figure 6:
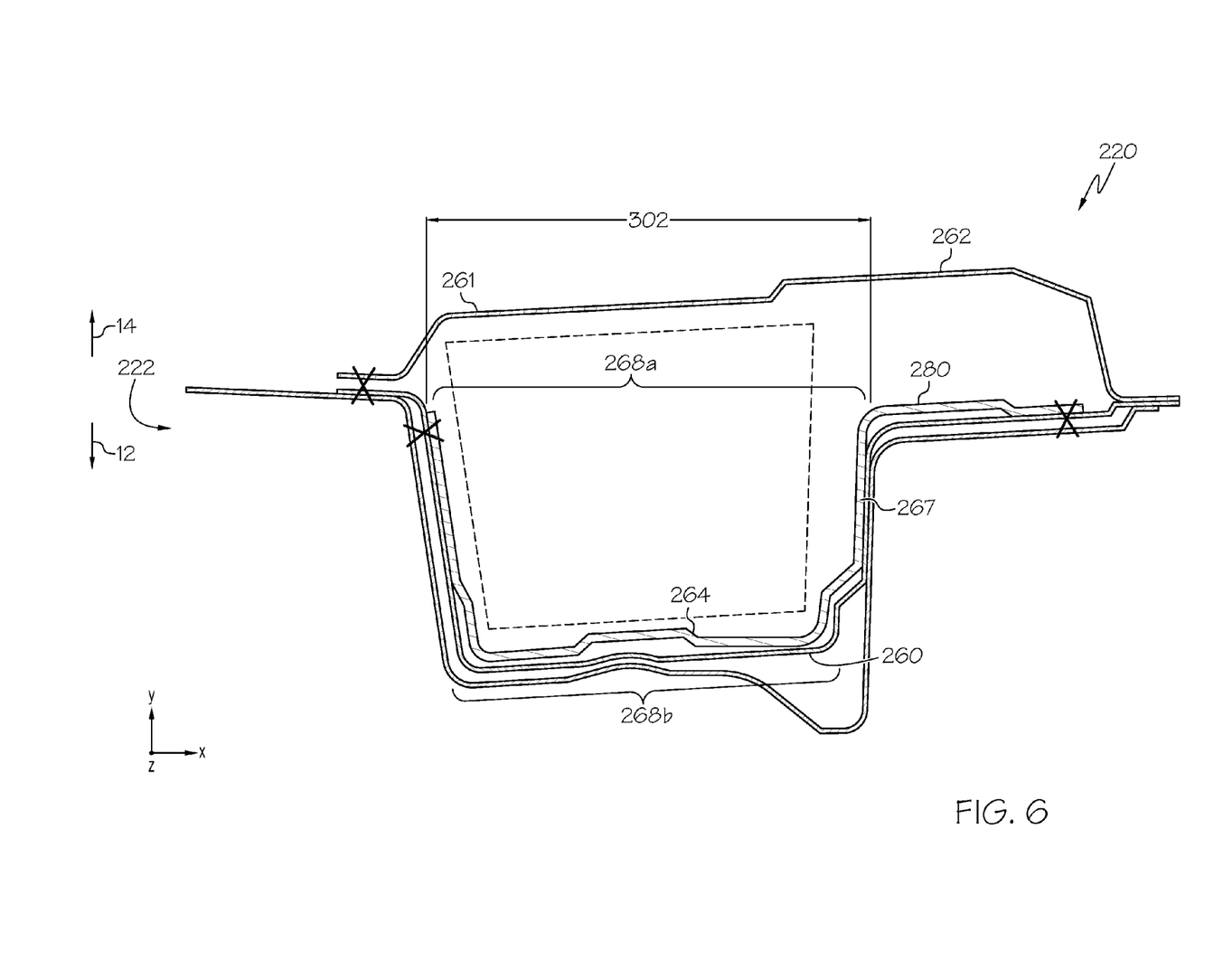
FIG. 6 schematically depicts a sectional view of an A-pillar portion of a vehicle along line 6-6 of FIG. 5.

Referring to FIG. 6, the inboard A-pillar member 262, the outboard A-pillar member 260, and the reinforcement member 264 may be arranged into a nested or partially-nested arrangement. In such an arrangement, the inboard A-pillar member 262, the outboard A-pillar member 260, and the reinforcement member 264 may include cross-sectional shapes that allow the inboard A-pillar member 262, the outboard A-pillar member 260, and the reinforcement member 264 to be assembled in close arrangement with one another. The cross-sectional shapes of the reinforcement member 264 and at least one of the inboard A-pillar member 262 and the outboard A-pillar member 260 may include a hat-shaped profile 268a, 268b as evaluated in the vehicle vertical direction. The hat-shaped profile 268a of the reinforcement member 264 may be nested into the hat-shaped profile 268b of the outboard A-pillar member 260, as depicted in FIGS. 5 and 6.

The reinforcement member 264 may also include a rear flange 280 that extends in a rearward direction in the vehicle longitudinal direction from the hat-shaped profile 268a of the reinforcement member 264. As depicted in FIG. 5, the rear flange 280 may be spaced apart from the rocker portion 228 in the vehicle vertical direction, such that a region of the A-pillar portion 222 that is coupled to the rocker portion 228 is free of a rear flange 280. Alternatively, the rear flange 280 may extend downward at least to the rocker portion 228 in the vehicle vertical direction. As depicted in FIG. 6, the rear flange 280 may extend to a rearward-most position relative to the outboard A-pillar member 260 such that the rear flange 280 is encapsulated within the A-pillar portion 222 when the inboard A-pillar member 262 is coupled to the outboard A-pillar member 260.

The rear flange 280 of the reinforcement member 264 may increase the stability of the reinforcement member 264. In some embodiments, the rear flange 280 of the reinforcement member 264 may increase the buckling resistance of the A-pillar portion 222 in the vehicle lateral, such that the A-pillar portion 222 can resist energy that tends to deform and buckle the A-pillar portion 222. The rear flange 280 of the reinforcement member 264 may also reduce tearing of the reinforcement member 264 following the introduction of energy into the A-pillar portion 222.

In some embodiments, the components of the A-pillar portion 222 may be selected from materials having a variety of thicknesses and strengths to provide an A-pillar portion 222 having desired strength and stiffness properties. The properties of the materials that are selected for use in the A-pillar portion 222 may also modify the energy absorption properties of the A-pillar portion 222, such that energy introduced to the A-pillar portion 222 can be selectively dissipated and/or directed rearward along the unibody 100.

Referring again to FIG. 5, in some embodiments, the outboard A-pillar member 260 may include a rocker cover member 270 that is positioned along a bottom of the outboard A-pillar member 260 and extends reardwardly in a vehicle longitudinal direction to overlap the rocker portion 228. In some embodiments, the outboard A-pillar member 260 may be coupled to the rocker portion 228. Further, in some embodiments, the reinforcement member 264 may include an A-pillar to rocker reinforcement 275 and a rocker reinforcement 272 that extend in the vehicle longitudinal direction and are coupled to the rocker portion 228 at a plurality of locations in the vehicle longitudinal direction. In some embodiments, the rocker reinforcement 272 of the reinforcement member 264 has a rocker reinforcement length 306 as evaluated in the vehicle longitudinal direction that is at least 3 times a maximum length 302 (FIG. 6) of the hat-shaped profile 268a of the reinforcement member 264 as evaluated in the vehicle longitudinal direction. In embodiments, the rocker reinforcement 272 may extend between the A-pillar portion 222 and the B-pillar portion 226 in the vehicle longitudinal direction.

Figure 7:
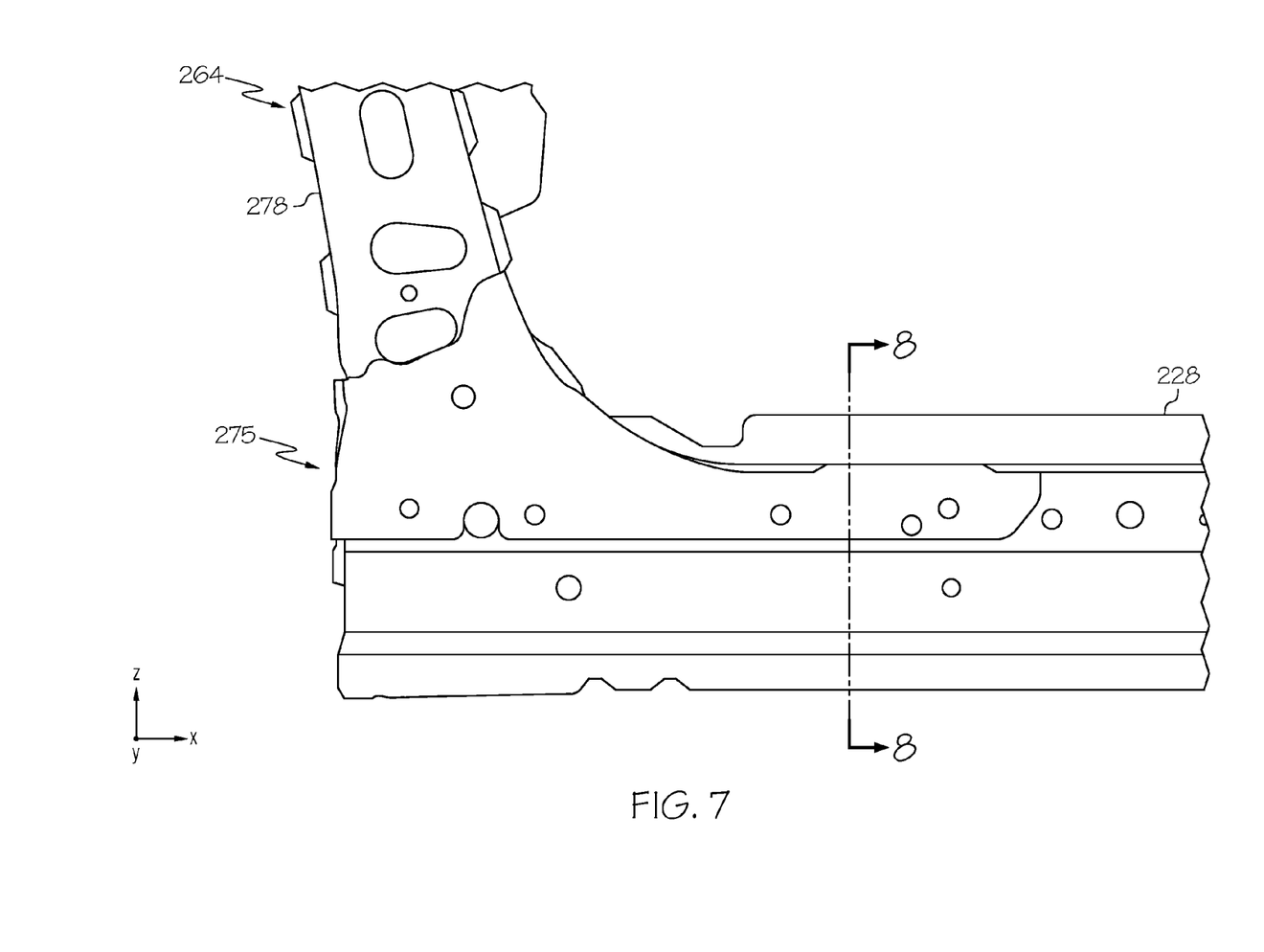
FIG. 7 schematically depicts an enlarged side view of a reinforcement member according and a rocker portion to one or more embodiments shown or described herein.

Referring to FIG. 7, an enlarged view of the reinforcement member 264 is depicted with the rocker portion 228. The reinforcement member 264 includes the A-pillar to rocker reinforcement 275 that extends along and is coupled the rocker portion 228 in the vehicle longitudinal direction. The A-pillar to rocker reinforcement 275 may extend at least 30% of the distance between the A-pillar portion 222 and the B-pillar portion 226 along the rocker portion 228 in the vehicle longitudinal direction. The A-pillar to rocker reinforcement 275 extends downward from an A-pillar reinforcement portion 278 of the reinforcement member 264. The A-pillar reinforcement portion 278 may be coupled to the A-pillar to rocker reinforcement 275 or may be integral with the A-pillar to rocker reinforcement 275.

Figure 8:
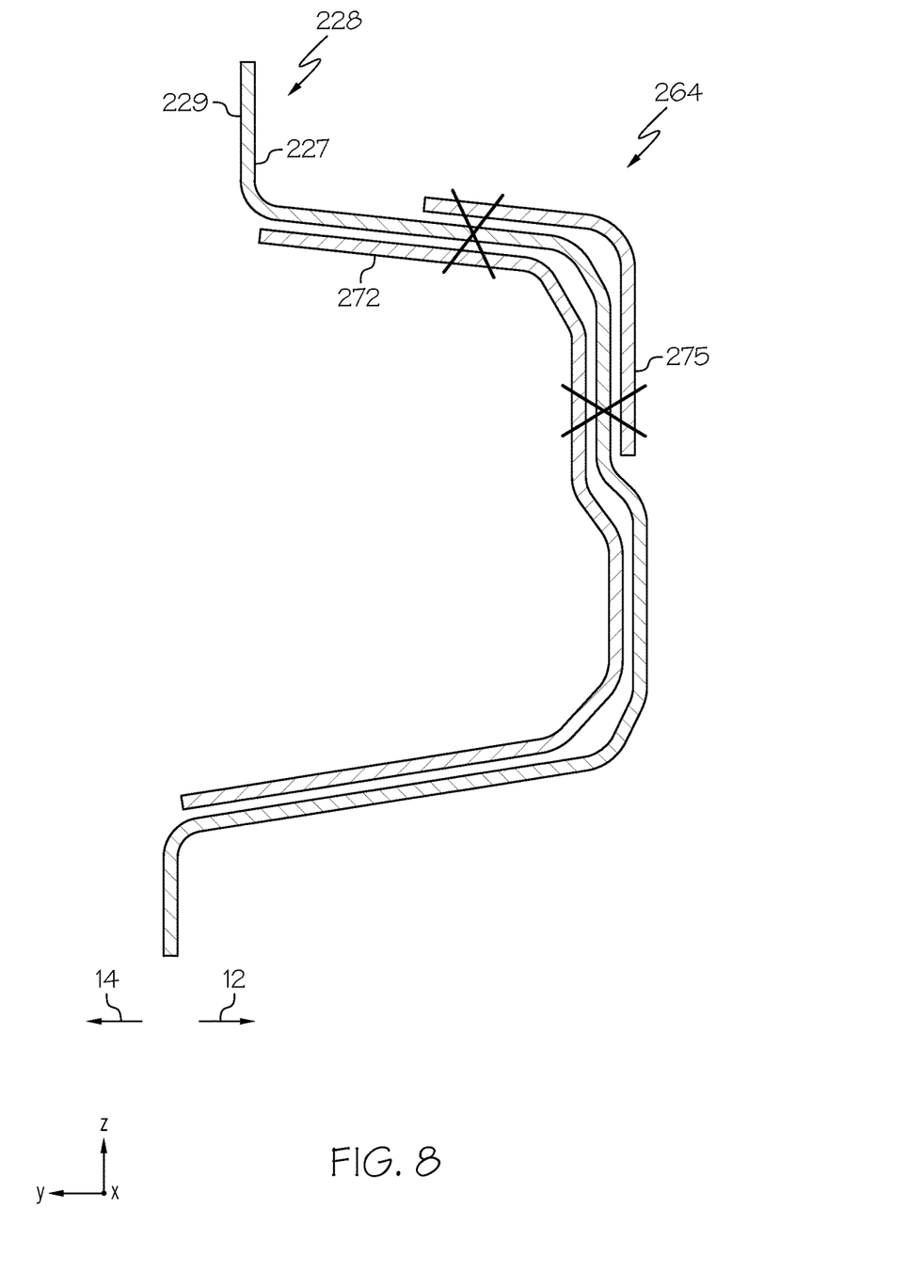
FIG. 8 schematically depicts a sectional view of the reinforcement member and the rocker of FIG. 7 along line 8-8.

Referring to FIG. 8, a section view of the rocker portion 228 and the reinforcement member 264 is shown along line 8-8 of FIG. 7. The A-pillar to rocker reinforcement 275 of the reinforcement member 264 is coupled to an outboard face 227 of the rocker portion 228. The rocker reinforcement 272 of the reinforcement member 264 is coupled to an inboard face 229 of the rocker portion 228 and is positioned inboard of the A-pillar to rocker reinforcement 275 in the vehicle lateral direction. Accordingly, components of the reinforcement member 264 may be coupled to the inboard face 229 and the outboard face of the rocker portion 228. In embodiments, the rocker reinforcement 272 and the A-pillar to rocker reinforcement 275 are directly coupled to each other with the rocker portion 228 positioned between the rocker reinforcement 272 and the A-pillar to rocker reinforcement 275. Alternatively, each of the rocker reinforcement 272 and the A-pillar to rocker reinforcement 275 are coupled to the rocker portion 228 and are indirectly coupled to one another through the rocker portion 228.

Referring again to FIG. 5, in some embodiments, at least one of the reinforcement member 264 or the outboard A-pillar member 260 may include a forward-facing shoulder 274 that extends in the vehicle lateral direction from the rocker reinforcement 272 or the rocker cover member 270, respectively, and is coupled to the rocker portion 228 along a forward-facing side 229 of the rocker portion 228. In some embodiments, the forward-facing shoulder 274 may be welded to the rocker portion 228. The forward-facing shoulder 274 of at least one of the reinforcement member 264 or the outboard A-pillar member 260 may stabilize the connection between the rocker portion 228 and the A-pillar portion 222. In such embodiments, the forward-facing shoulder 274 may be able to resist energy that is introduced to the A-pillar portion 222 and the rocker portion 228, such that separation between the A-pillar portion 222 and the rocker portion 228 may be minimized.

In some embodiments, the door surround ring 220 may include at least one rocker bulkhead 276 that extends in the vehicle lateral direction from the reinforcement member 264 to the rocker portion 228. The rocker bulkheads 276 may stabilize the connection between the door surround ring 220 and the rocker portion 228. In one embodiment, a rocker bulkhead 276 may be coupled to the rocker portion 228 and the A-pillar portion 222 and is positioned to be approximately aligned with the rear face 267 (as depicted in FIG. 6) of the hat-shaped profile 268a of the reinforcement member 264. In another embodiment, a rocker bulkhead 276 may be coupled to the rocker portion 228 and the A-pillar portion 222 and is positioned rearward of the hat-shaped profile 268a and the rear flange 280 of the reinforcement member 264 and forward of a rearward channel end 265 of the reinforcement member 264.

Referring again to FIG. 6, in some embodiments, a spacing region 261 between the inboard A-pillar member 262 and the reinforcement member 264 may be free of bulkheads that would otherwise couple the inboard A-pillar member 262 and the reinforcement member 264 to one another. Because the spacing region 261 is free of such bulkheads, and because the inboard A-pillar member 262 is spaced apart from the reinforcement member 264 within the spacing region 261 due to the hat-shaped profile 268a of the reinforcement member 264, the reinforcement member 264 may be free of coupling to the inboard A-pillar member 262 within the spacing region 261. Maintaining a lack of coupling between the reinforcement member 264 and the inboard A-pillar member 262 within the spacing region 261 may reduce the stiffness of the A-pillar portion 222 at locations proximate to the spacing region 261, such that the A-pillar portion 222 is free to elastically and plastically deform when energy is introduced thereto, thereby allowing the A-pillar portion 222 to dissipate energy without separation of the components of the A-pillar portion 222.

The arrangement of the inboard A-pillar member 262, the outboard A-pillar member 260, and the reinforcement member 264 may increase the strength and/or stiffness of the A-pillar portion 222 by selectively positioning the components of the A-pillar portion 222. In some embodiments, the inboard A-pillar member 262, the outboard A-pillar member 260, and the reinforcement member 264 may be positioned to locally and selectively increase the energy absorption properties of the A-pillar portion 222. Such selective positioning of the inboard A-pillar member 262, the outboard A-pillar member 260, and the reinforcement member 264 may increase the energy absorption capacity of the A-pillar portion 222 such that a large amount of energy associated with a small overlap barrier impact may be dissipated forward of the passenger cabin of the vehicle.

It should now be understood that embodiments according to the present disclosure include unibody structures for a vehicle that provide elevated levels of strength and/or stiffness to the vehicle. The unibody structures incorporate a door surround ring that is assembled separately from the vehicle side outer panel. By assembling the door surround ring separately from the vehicle side outer panel, access for welding is provided in an inboard direction and an outboard direction, such that the quantity and locations of welds between components of the door surround ring may be enhanced. Further, by assembling the door surround ring separately from the vehicle side outer panel, joint reinforcement members may be positioned relative to the door surround ring at positions that are encapsulated by the vehicle side outer panel following vehicle assembly. Assembly methods according to the present disclosure may allow for structures having higher strength and/or stiffness than conventionally-assembled structures. Further, embodiments according to the present disclosure may include door surround rings having an inboard A-pillar portion, and outboard A-pillar portion, and a reinforcement member that is positioned between and coupled to the inboard A-pillar portion and the outboard A-pillar portion. The reinforcement member may include a plurality of reduced thickness regions that are positioned in a vehicle vertical direction along the reinforcement member. The reinforcement member may selectively and directionally modify the strength and/or stiffness of the A-pillar portion to dissipate and direct energy that is introduced to the A-pillar portion.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A door surround sub-assembly comprising:
   a door surround ring comprising:
      a forward pillar component;
      a rocker component welded to the forward pillar component;
      a rearward pillar component welded to the rocker component; and
      a roof rail component welded to the rearward pillar component;
   a vehicle side outer panel welded to the door surround ring; and
   a vehicle side inner panel coupled to the door surround ring; wherein the forward pillar component, the rocker component, the rearward pillar component, and the roof rail component are formed as separate components that are welded to one another before the door surround ring is welded to the vehicle side outer panel and the vehicle side inner panel.

2. The sub-assembly of claim 1, wherein the vehicle side outer panel and the door surround ring are spaced apart from one another in an interior volume, the vehicle side outer panel encapsulating at least a portion of the door surround ring in the vehicle lateral direction.

3. The sub-assembly of claim 2, wherein the vehicle side outer panel is free from welds at positions within the interior volume.

4. The sub-assembly of claim 1, wherein the door surround ring further comprises a roof patch that is coupled to a side region of the forward pillar component and the roof rail component and extends along the forward pillar component and the roof rail component across a joint location at which the forward pillar component and the roof rail component are coupled to one another.

5. The sub-assembly of claim 4, wherein the roof patch is welded to the forward pillar component and the roof rail component along a patch weld interface that is offset from a clamshell weld interface of the forward pillar component or the roof rail component evaluated in the vehicle lateral direction.

6. The sub-assembly of claim 5, wherein the patch weld interface is positioned in the outboard direction relative to the clamshell weld interface and between the forward pillar component and the vehicle side outer panel in the vehicle lateral direction.

7. The sub-assembly of claim 1, wherein at least a portion of the forward pillar component overlaps at least a portion of the roof rail component.

8. A method of assembling a unibody for a vehicle comprising:
  assembling a door surround ring comprising a forward pillar component, a roof rail component, a rearward pillar component, and a rocker component formed as separate components that are assembled together to form the door surround ring;
  subsequent to assembling the door surround ring, installing the door surround ring into a vehicle side outer panel;
  coupling the door surround ring to the vehicle side outer panel; and
  subsequent to installing the door surround ring into the vehicle side outer panel, coupling the door surround ring and the vehicle side outer panel to a vehicle interior structural member.

9. The method of claim 8, further comprising installing the door surround ring into a vehicle side inner panel subsequent to assembling the door surround ring and coupling the door surround ring to the vehicle side inner panel.

10. The method of claim 8, wherein the door surround ring is assembled by:
  welding the forward pillar component to the roof rail component and the rocker component; and
  welding the rearward pillar component to the roof rail component and the rocker component.

11. The method of claim 10, wherein the door surround ring further comprising a roof patch that is coupled to the forward pillar component and the roof rail component and extends along the forward pillar component and the roof rail component across a joint location at which the forward pillar component and the roof rail component are coupled to one another.

12. The method of claim 11, wherein the roof patch is welded to the forward pillar component and the roof rail component along a patch weld interface that is offset from a clamshell weld interface of the forward pillar component or the roof rail component evaluated in a vehicle lateral direction.

13. The method of claim 12, wherein the patch weld interface is positioned in an outboard direction relative to the clamshell weld interface and between the forward pillar component and the vehicle side outer panel in the vehicle lateral direction.

14. The method of claim 10, wherein at least a portion of the forward pillar component overlaps at least a portion of the roof rail component.

15. The method of claim 10, wherein the forward pillar component is welded to the roof rail component from an inboard direction and from an outboard direction.

16. A unibody for a vehicle comprising:
  a vehicle interior structural member;
  a vehicle side outer panel coupled to the vehicle interior structural member; and
  a door surround ring coupled to the vehicle side outer panel, the door surround ring comprising:
    a forward pillar component;
    a rocker component welded to the forward pillar component;
    a rearward pillar component welded to the rocker component; and
    a roof rail component welded to the forward pillar component and the rearward pillar component, wherein components of the door surround ring are formed as separate components that are welded to one another by welds that are applied in an inboard direction and an outboard direction relative to a vehicle lateral direction; and
  a roof patch that is welded to the forward pillar component and the roof rail component along a patch weld interface that is offset from a clamshell weld interface of the forward pillar component or the roof rail component evaluated in the vehicle lateral direction.

17. The unibody of claim 16, wherein the patch weld interface is positioned in the outboard direction relative to the clamshell weld interface and between the forward pillar component and the vehicle side outer panel in the vehicle lateral direction.

18. The unibody of claim 16, wherein the vehicle side outer panel and the door surround ring are spaced apart from one another in an interior volume, the vehicle side outer panel encapsulating at least a portion of the door surround ring in the vehicle lateral direction.

19. The unibody of claim 16, wherein at least a portion of the forward pillar component overlaps at least a portion of the roof rail component.

20. The unibody of claim 19, wherein the vehicle side outer panel is free from welds at positions within the interior volume.

* * * * *